Sept. 20, 1949.                    G. J. GRIMES                  2,482,269
            TILTING WORKPIECE SUPPORT, ESPECIALLY FOR USE
            WITH PROCESSING EQUIPMENT FOR CONTAINERS
Filed Feb. 25, 1946                                     2 Sheets-Sheet 2
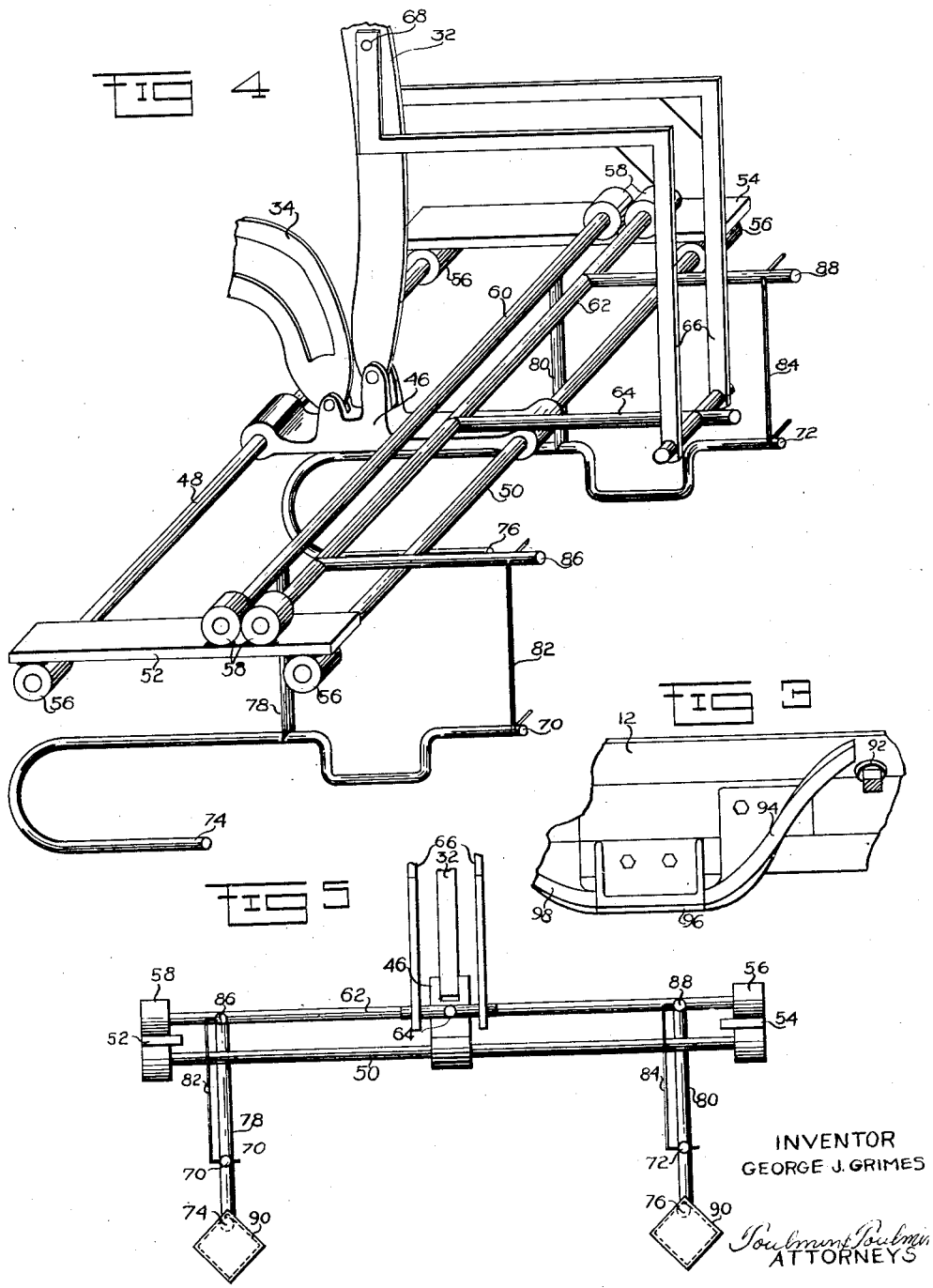
INVENTOR
GEORGE J. GRIMES
ATTORNEYS Patented Sept. 20, 1949

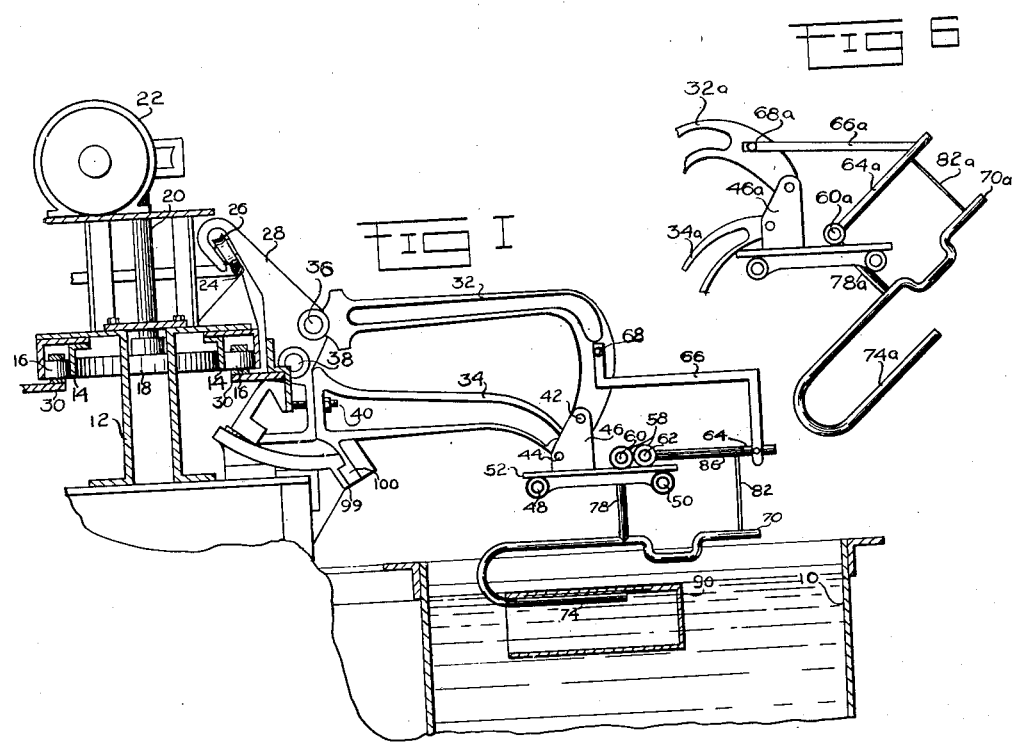

2,482,269

UNITED STATES PATENT OFFICE 2,482,269

TILTING WORKPIECE SUPPORT, ESPECIALLY FOR USE WITH PROCESSING EQUIPMENT FOR CONTAINERS

George J. Grimes, Kankakee, Ill., assignor to Frederic B. Stevens, Inc., Detroit, Mich., a corporation of Michigan Application February 25, 1946, Serial No. 650,098

5 Claims. (Cl. 134—160)

This invention relates to process machinery and, particularly, to mechanism for processing articles such as boxes, pails, tubs and shells through a plurality of steps.

Many workpieces which are closed at one end are processed through a plurality of cleaning and pickling baths prior to subsequent work operations such as electroplating and it is a particular object of the present invention to provide an improved mechanism for transporting such workpieces through a plurality of steps in a manner which will result in an improved product.

This invention proposes to provide a mechanism for tilting the article being operated as it is removed from each bath in order to drain the solution therefrom thereby to prevent contamination of the next bath and also to assist in the cleaning of the inside of the workpiece. The tipping of the article also assists in enabling the solution to reach the full inside area thereof.

Another object of this invention is to provide a device especially adapted for handling workpieces which are hollow and closed at one end, and the device being adapted for connection with the workpiece transporting arms of a standard processing machine.

Still another object is to provide a device according to the foregoing object which is simple and cheap to construct, which tilts the workpiece to drain the solution therefrom as it is lifted from one tank and lowers the workpiece so that when it is dipped in the solution of the next tank it is completely filled with the said solution.

Another object is to provide such a device wherein a plurality of workpieces may be supported to be lifted and tilted simultaneously as they are transferred from one processing bath to another.

These and other objects and advantages will become more apparent upon reference to the following description and the accompanying drawings in which:

Figure 1 is a sectional view through a machine having a workpiece supporting fixture according to this invention with the workpiece immersed in the processing bath;

Figure 2 is a view similar to Figure 1 but showing the workpiece lifted to be transferred to another solution or to be removed from the machine;

Figure 3 is a plan view indicated by the line 3—3 on Figure 1 and showing the lifting cam which lifts the arms and fixture that carries the workpiece;

Figure 4 is a perspective view showing how this invention may be constructed for supporting a plurality of workpieces;

Figure 5 is a view looking in at the ends of the workpieces as they are supported on the device as shown in Figure 4; and Figure 6 is a view of a modified construction somewhat different from that illustrated in Figures 1 through 5.

Referring to the drawings, a processing machine adapted for employing this invention may consist of a plurality of tanks as indicated at 10 which are arranged in a line or around an oval path. These tanks contain the various pickling, cleaning and washing solutions through which a workpiece is passed through a complete cycle of operations.

Stationary relative to the tank is a frame 12 which carries a track 14 within which is located a chain 16. The chain is engaged at the ends of the machine by sprockets, one of which is indicated at 18 and at least one of which is driven as by a shaft 20 that is connected through reduction gearing with a motor as at 22. The frame 12 also supports a track 24 by means of suitable brackets which is adapted for engaging and supporting the rollers 26 which are journaled in the brackets 28. While the drawings show only one of the brackets 28, it will be understood that there are a plurality thereof arranged along the track 24 at suitably spaced intervals.

The lower end of the bracket 28 is connected by a bar 30 with the chain 16 to be supported and driven thereby. Thus, as the chain is driven by the sprocket 18 around the track 14, the brackets 28 also travel about the machine and are supported on the track 24 and by the chain 16.

Pivoted in the bracket 28 are a pair of arms 32 and 34 on the centers 36 and 38, respectively. The lower arm 34 includes a stop screw 40 which abuts a flange on the bracket 28 so that the arm 34 is stopped at a predetermined lower position. The arms 32 and 34 comprise pivots 42 and 44 at their outer ends which are disposed at the same spacing and angle as the pivots 36 and 38. Carried between the pivots 42 and 44 is a bracket 46, better seen in Figure 4, which supports a pair of transverse rods 48 and 50. The rods 48 and 50 carry between their outer ends the plates 52 and 54 which are secured to the said rods as by the bushings 56 which fit over the ends of the rods and which are welded to the plates.

The plates 52 and 54, in turn, support pairs of bushings 58 which rotatably receive the rods 60 and 62. The rod 62 has connected thereto intermediate to its ends a horizontally extending rod 64 that has pivotally connected to its outer ends a pair of arms 66 that are in turn journalled on the arm 32 at the pivot 68.

The workpiece supporting members comprise the hangers 70 and 72 which have the bent ends 74 and 76 thereon which are adapted for being inserted into the open end of a cylindrical workpiece such as a bucket, pail, shell, etc. The hangers 70 and 72 are supported from the rod 60 by a pair of vertically extending rods 78 and 80, and are connected at their outer ends by wires or rods 82 and 84 with the horizontally extending rods 86 and 88 that are fastened to the rod 62. The resulting arrangement is such that the end portions 74 and 76 of the workpiece hangers are horizontal when the arms are in their down position but, when the arms are elevated, the workpiece hanger rotates in a counterclockwise direction as viewed in Figure 4 and tilts the open end of the workpiece downward so that any solution therein is drained out. Throughout the tilting of the workpiece hanger the bracket 46 and plates 52 and 54 remain horizontal and the tilting of the workpiece supporting rods is effected through the arms 66 and the rods 64, 62, 86 and 88.

Figure 2 illustrates the arms in their elevated position and it will be seen that the workpiece 90 is lifted free of the solution and is tilted so that it is drained completely before being passed to the next tank.

For lifting the arms 32 and 34 there may be provided any of several well-known mechanisms, and for the purpose of illustration there is shown in the drawings a cam and roller mechanism. In Figures 1 and 2 the arm 34 has fastened thereto a roller 92 which is engaged by a cam as the arms approach the end of a tank for lifting the said arms and engages another cam for maintaining the arms lifted while they are passing over the end of the tank. The lift cam is better illustrated in Figure 3 wherein it will be seen to comprise a member 94 that is connected with the machine frame 12 and which consists of an incline to be engaged by the rollers 92. The cam which maintains the arms lifted is indicated at 96 and consists of a straight path of the proper length. A second cam 98 may also be carried by the frame 12 for lowering the arms when they are in position over the next solution tank.

While this invention has been illustrated and described in connection with the pickling, cleaning or washing process, it will be understood that it is equally well adapted for processes involving electrodeposition on the said workpiece in which case the frame 12 may carry a rail 99 which makes contact with the workpiece through a shoe 100 carried on the arm 34. In the event that the workpieces were being electroplated, the same advantages would obtain in connection with the draining of the workpiece as it passed through pickling, washing, rinsing and plating baths for a complete and automatic plating cycle.

While the workpiece 90 has been shown as resting in a horizontal position when it is in the solution, it will be understood that it could be lowered slightly at its closed end if desired in order better to fill the cavity therein with solution.

Figure 6 is a somewhat modified construction in which the arms 32a and 34a pivotally support the frame 46a at their ends. Pivotally mounted on the frame 46a is one or more workpiece supporting arms 74a which are connected to the said frame by the rods 78a. The rod 60a which connects with the rod 78a and which is journaled in the frame 46a has also connected therewith the rod 64a which is connected by the lever or drag link 66a with the pivot 68a on the arm 32a. The rod 64a is connected with the end 70a of the workpiece supporting member by the link 82a which adds rigidity to the mechanism when heavy workpieces are to be lifted and tilted.

It will be understood that this invention is susceptible to modification in order to adopt it to different usages and conditions and, accordingly, it is desired to comprehend such modifications within this invention as may fall within the scope of the appended claims.

I claim:

1. In a processing machine having a solution tank; a pair of pivoted arms extending over said tank; a workpiece supporting fixture pivoted to the ends of said arms and having a portion supporting a workpiece below the level of the solution in the tank; power means for moving said arms to pass the workpiece through said solution; means for actuating said arms about their pivots to lift said workpiece supporting fixture away from said tank; and means responsive to the lifting of said fixture away from said tank for tilting said workpiece supporting portion thereby to facilitate the draining of said solution from said workpiece.

2. In a processing machine; a tank for holding solution; a track adjacent said tank; a bracket carried on said track and a pair of arms pivoted to said bracket and extending over said tank; a bracket pivoted to the ends of said arms and arranged to remain horizontal as said arms are lifted; a workpiece supporting member pivotally secured to said bracket and adapted for receiving open ended workpieces and for supporting them below the level of the solution of said tank; and means responsive to the lifting of said arms for tilting said workpiece supporting member to depress the open end of workpieces carried thereby for draining the solution therefrom.

3. In a processing machine; tank means; track means adjacent said tank means; a plurality of bracket means slidable on said track means and power means for so moving said bracket means; a pair of arms pivoted in each of said bracket means and movable between a lower position and an upper position; a frame pivoted to the ends of said arms and arranged to remain horizontal as said arms are lifted; a workpiece supporting means pivotally secured to said frame and adapted for supporting hollow workpieces having closed ends in said solution and below the level thereof; cam means to tilt said arms upwardly as they approach the end of said tank means; and means comprising an auxiliary link connected between said workpiece supporting means and one of said arms for tilting said means as said arms lift thereby to drain the solution from said workpieces.

4. A workpiece supporting fixture especially adapted for supporting hollow workpieces having one end open in a processing mechanism such as a washing or electroplating machine comprising a pair of arms having pivots in the ends thereof; a frame carried on said pivots; means pivotally supported on said frame for engaging a plurality of workpieces; and a link connected between said workpiece supporting means and the upper of said arms whereby said workpiece supporting means is tilted to depress the open end of workpieces carried thereby when said arms are tilted to lift the workpieces from a solution tank.

5. In a processing machine having a solution tank; a pair of arms extending over said tank and pivoted to be lifted away from said tank; a frame pivotally secured to the ends of said arms and adapted to move with said arms while remaining parallel to its original position; a workpiece supporting member pivoted on said frame; cam means for lifting said arms as the same traverse said tank; and a link pivoted to said workpiece supporting member and to one of said arms and operable to support said workpiece supporting member in a horizontal position when said arms are lowered and to tilt said workpiece supporting member from the horizontal when said arms are lifted, the arrangement being such that open ended workpieces are completely filled with solution when supported on said member when said arms are down they are tilted to drain the solution therefrom when said arms are lifted.

GEORGE J. GRIMES.

REFERENCES CITED

The following references are of record in the file of this patent:

UNITED STATES PATENTS

| Number    | Name     | Date          |
|-----------|----------|---------------|
| 1,185,329 | Janisch  | May 30, 1916  |
| 2,267,190 | Claffy   | Dec. 23, 1941 |
| 2,388,987 | Morrison | Nov. 13, 1945 |